United States Patent [19]
Paré et al.

[11] 4,216,096
[45] Aug. 5, 1980

[54] OZONE GENERATION DEVICE AND ELECTRODE

[75] Inventors: Maurice Paré, Chambourcy; Christian Coste, Versailles, both of France

[73] Assignee: Degremont, France

[21] Appl. No.: 940,616

[22] Filed: Sep. 8, 1978

[30] Foreign Application Priority Data

Oct. 18, 1977 [FR] France ............................ 77 31248

[51] Int. Cl.² .................... C01B 13/12; C25B 11/02; B01K 1/00
[52] U.S. Cl. .................................. 250/539; 250/540; 313/217; 313/332
[58] Field of Search ............... 250/539, 540, 532, 535; 313/217, 332

[56] References Cited

U.S. PATENT DOCUMENTS

| | | | |
|---|---|---|---|
| 982,587 | 1/1911 | Gerard | 250/540 |
| 987,902 | 3/1911 | Meeker | 250/540 |
| 1,059,014 | 4/1913 | Wallace | 250/540 |
| 3,530,058 | 9/1970 | Blanchard | 250/539 |

*Primary Examiner*—Deborah L. Kyle
*Attorney, Agent, or Firm*—Wenderoth, Lind & Ponack

[57] ABSTRACT

An outer tubular electrode is adapted to be connected to a first terminal of a high voltage AC source. A dielectric tube is positioned within the outer tubular electrode and is spaced therefrom to form a discharge gap. The dielectric tube has a closed first end and an open second end. An electrically conductive layer, for example of metal, covers the major portion of the inner surface of the dielectric tube. An electrically conductive cap, for example of metal, includes a partial spherical portion, a conical portion and a cylindrical portion. The cylindrical portion is in contact with the electrically conductive layer adjacent the open second end of the dielectric tube. The partial spherical portion of the cap has a concave surface which faces the interior of the dielectric tube. The partial spherical portion is connected to a second terminal of the high voltage AC source, such that the cap and the layer form an inner electrode. When a voltage is applied between the inner and outer electrodes, an oxygen containing gas which is circulated through the discharge gap is transformed into ozone by silent discharge.

12 Claims, 3 Drawing Figures

OZONE GENERATION DEVICE AND ELECTRODE

BACKGROUND OF THE INVENTION

The present invention relates to a tubular type ozone generator and an inner electrode thereof.

Ozone generators of the tubular type, and which operate under the principle of silent discharge, are known and include an outer electrically conductive tubular electrode, a dielectric tube positioned within the outer tubular electrode and spaced therefrom to form a discharge gap, and an inner electrode contacting the inner surface of the dielectric tube. Conventionally, the inner electrode is in the form of a metal layer coated over the inner surface of the dielectric tube. The outer electrode and the inner electrode are connected to opposite terminals of a high voltage AC source, such that when a voltage is applied between the inner and outer electrodes and across the discharge gap, then an oxygen containing gas circulated through the discharge gap is transformed into ozone by means of a well understood phenomenon generally referred to as "silent discharge." Ozone generator systems normally include a plurality of parallely arranged generators of the above type.

The dielectric tube normally is a glass cylinder having a constant thickness and having one end closed in the form of a spherical, conical or even flat bottom, with the other end being open. The dielectric tube is positioned concentrically within an outer tubular member, normally a metal cylinder, which forms the outer electrode. An annular, constant thickness gap between the dielectric tube and the outer tubular electrode forms a discharge gap through which is circulated an oxygen containing gas, for example oxygen or air.

This type of arrangement forms a capacitor including an outer electrode formed by the metal tubular member, an inner electrode formed by the metal coating, and a pair of dielectrics, the first being solid and formed by the glass tube and the second being gaseous and formed by the discharge gap.

Generally, the glass tube and the metal coating on the inner surface thereof are conventionally referred to as a "high voltage electrode," while the outer metal tubular electrode is conventionally referred to as a "low voltage electrode" or a "ground electrode".

As is further conventional in the art, the high voltage electrode is connected to a terminal of a high voltage AC source by means of a brush shaped metal connector which is inserted into the glass tube and which electrically contacts the metal layer on the inner surface thereof. The high voltage AC source may be any locally available supply circuit having the necessary intermediate or high frequencies, for example approximately between 50 and 5,000 cycles per second. The low voltage terminal of the source is grounded, and conventionally the low voltage or outer electrode of the ozone generator is grounded, for example by connection to the low voltage terminal of the source.

When a voltage is applied between the two electrodes of the ozone generator, and when a flow of air or oxygen is continuously circulated through the discharge gap, and when the applied voltage reaches a certain value, a phenomenon known as "silent discharge" occurs across the discharge gap, thereby transforming a portion of the oxygen in the discharge gap into ozone.

For a constant flow of gas, a constant gas pressure and for a discharge gap of a given size, the amount of ozone produced by this type of apparatus will increase as a function of increased voltage applied between the inner and outer electrodes. However, in employing conventional prior art ozone generators of this type, the maximum value of such applied voltage is limited to a value substantially less than that which would theoretically be possible. Specifically, when the applied potential reaches a certain value less than the theoretical maximum value, a parasitic discharge or sparking occurs between the outer electrode and the end of the inner electrode adjacent the open end of the glass tube. More particularly, the lines of force of the electric field which is generated concentrate at the outer end of the inner electrode, and this concentration of lines of force results in the emission of sparks.

Such sparks result in a reduction in the efficiency of the ozone generator, since the sparks do not contribute to the generation of ozone, and since this concentration of the lines of force may result in local deterioration of the material of the generator and can result in a short circuit. Thus, conventional ozone generators of this type cannot be operated above a certain potential difference, for example 20,000 volts.

One prior art attempt to eliminate such sparking is disclosed in French Pat. No, 1,530,551 and discloses a metal ring having a cylindrical portion in contact with the metal coating forming the inner electrode and an inwardly curved portion having a parabolic configuration and extending outwardly beyond the outer end of the inner electrode. The brush shaped contact is joined to a terminal of the high voltage AC source by means of a connector which extends through the open end of the curved portion of the metal ring. In this type of arrangement, since the metal ring is curved away from the outer electrode, the effect of sparking between the outer electrode and the outer end of the inner electrode is reduced.

However, even the arrangement of French Pat. No. 1,530,551 is not entirely satisfactory.

SUMMARY OF THE INVENTION

With the above discussion in mind, it is an object of the present invention to provide an improved ozone generation device of the tubular type and operable on the silent discharge principle.

More particularly, it is an object of the present invention to provide such an improved ozone generation device wherein a much higher potential difference, as compared with prior art devices, may be applied between the inner and outer electrodes without the generation or emission of sparks or discharge between the outer end of the inner electrode and the outer electrode.

A further object of the present invention is to provide an improved inner electrode configuration for use in such an ozone generation device.

These objects are achieved in accordance with the present invention by providing that the inner electrode include an electrically conductive layer, for example a metal coating, covering a major portion of the inner surface of the dielectric glass tube, and an electrically conductive cap, for example of metal, positioned in contact with the metal layer at an end thereof which is adjacent the open end of the dielectric tube. The cap has a partial spherical portion and a conical portion extending therefrom. The partial spherical portion has a concave surface facing the interior of the inner electrode and the dielectric glass tube.

Preferably, the cap further includes a cylindrical portion which extends from the conical portion and which is removably in close electrical contact with the metal coating.

The exterior of the area of the junction between the cylindrical portion and the conical portion of the cap is rounded, to thereby reduce any potential concentration of lines of force in such area.

Preferably, the configuration of the cap is predetermined such that it substantially corresponds, or at least corresponds as closely as possible, to the shape of equipotential surfaces which are established, upon the application of the high voltage between the inner and outer electrodes, in that volume or space adjacent the end of the metal layer which is turned toward the open end of the dielectric glass tube. The equipotential surfaces which will occur in a given installation can be calculated in a known manner according to the theory and teachings of Theodore Lehmann. The length of the conical portion and the radius of the partial spherical portion will be determined so as to avoid any concentration of lines of force of the electric field.

In accordance with a further feature of the present invention, the cylindrical portion of the cap is formed by a plurality of flexible longitudinally extending members which are separated by a plurality of longitudinally extending slits, with the flexible longitudinally extending members having identical dimensions. Such flexible members are formed to have an elasticity and size such that the cap may be placed in close contact with the metal layer on the inner surface of the glass tube. Thus, the outer end of the inner electrode, formed by the metal layer and the metal cap, is essentially continuously curved and closed in on itself.

In accordance with a further feature of the present invention, the longitudinally extending slits may extend through a portion of the length of the conical portion, with the arrangement being that the slits in the cylindrical portion and conical portion appear on equally spaced generatrices of the cylindrical portion and conical portion.

To obtain a homogeneous electric field within the spherical and conical portion of the cap, the slits are maintained relatively narrow, for example having a maximum width of approximately 4.5 mm. The number of slits and longitudinally extending members is not in and of itself particularly important, as long as the configuration and structure is such to ensure a tight contact between the metal layer and the cap.

The cap is preferably made of a carefully polished metal material which is treated, for example by annealing, to have a high degree of elasticity. The cap has a thickness of several tens of millimeters. It is believed that those of ordinary skill in the art will understand the types of metals which may be employed for the metal layer and metal cap forming the inner electrodes. Such metals must have corrosion resistance to ozone. Examples of such metals are stainless steel, aluminum and titanium, it being understood however, that other metals may be employed as will be apparent to those skilled in the art.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
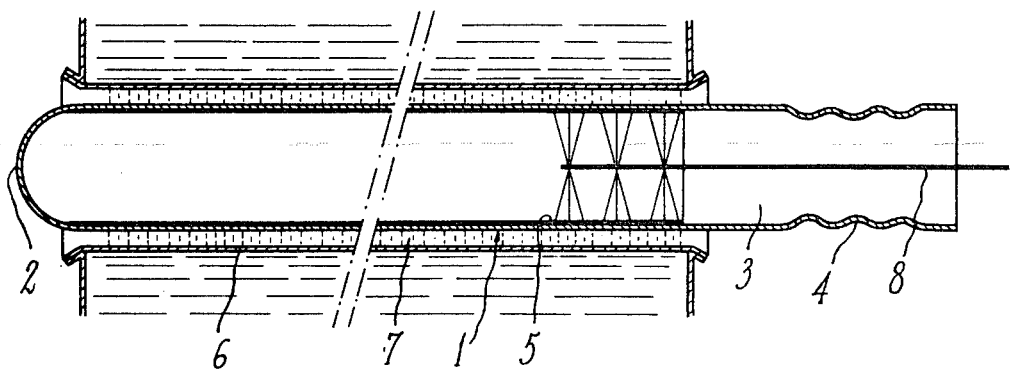
FIG. 1 is a longitudinal section schematically illustrating a prior art ozone generator.

With reference now to FIG. 1 of the drawings, a prior art ozone generation device of the tubular type will be described. Specifically, FIG. 1 illustrates a standard high voltage inner electrode including a dielectric tube 1, for example formed of glass, having a closed end 2 and an open end 3, as well as an electrically conductive coating 5, for example a metal coating, covering a substantial portion of the inner surface of the tube. The outer electrode is in the form of a metal tube 6 coaxially surrounding the dielectric tube 1. The space between the inner surface of outer electrode tube 6 and the outer surface of dielectric tube 1 forms a discharge gap 7 through which is continuously circulated air or oxygen. Inner metal coating 5 is connected in a conventional manner by means of brush device 8 to one terminal of a high voltage AC source, and outer electrode 6 is grounded, i.e. connected to another terminal of the high voltage AC source, as is known.

In the above prior art arrangement, however, lines of force of the electric field tend to be concentrated at the outer end of coating 5, i.e. the right hand end of coating 5 as shown in FIG. 1. Therefore, as the potential difference between the inner and outer electrodes is increased, there will occur a voltage at which spurious discharges or sparks will be emitted between the outer end of coating 5 and the facing end portion of outer electrode 6.

However, in accordance with the present invention, the inner electrode configuration, as well as the manner of connection thereof the the high voltage AC source, is provided so as to substantially eliminate the emission of spurious discharge or sparks between the outer end of the metal coating and the facing portion of the outer electrode, or at least to substantially increase the minimum voltage at which such sparking occurs.

Figure 2:
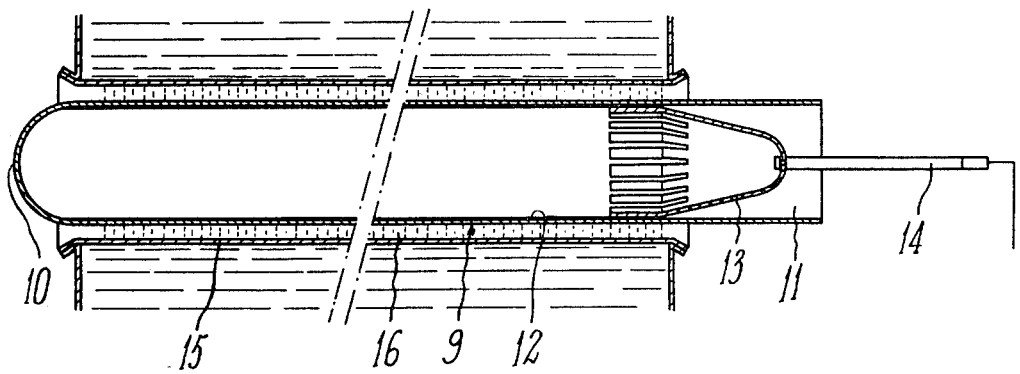
FIG. 2 is a view similar to FIG. 1, but illustrating a preferred embodiment of an ozone generator and an inner electrode configuration thereof in accordance with the present invention.

More particularly, as shown in FIG. 2 of the drawings, the ozone generation device includes an outer electrode configuration which includes a metal tube 15 and which in all respects may be the same as that shown in FIG. 1 or as is conventional in the art. However, the inner electrode configuration is uniquely constructed in accordance with the present invention. Specifically, there is provided a dielectric tube 9, for example a glass tube, coaxially positioned within outer electrode 15. Glass tube 9 has a closed end 10 and an open end 11. An electrically conductive layer 12 covers a major portion of the inner surface of glass tube 9. The annular space between the inner surface of outer electrode 15 and the outer surface of glass tube 9 forms a discharge gap 16.

In accordance with the present invention, the inner electrode also includes an electrically conductive cap 13, for example a metal cap, which electrically contacts metal layer 12 and which has a concave inner surface which faces the interior of the dielectric tube 9. The center of the outermost portion of cap 13 is connected to a terminal of a high voltage AC source [not shown] by means of a connector 14. Outer or ground electrode 15 is connected to ground, i.e. to another terminal of the high voltage AC source, in a known manner.

Figure 3:
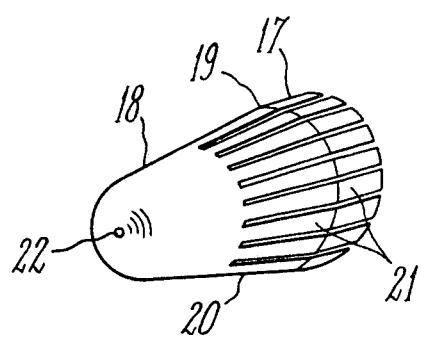
FIG. 3 is an enlarged perspective view of a cap forming a portion of the inner electrode of FIG. 2.

As shown in FIG. 3 of the drawings, the cap 13 includes a cylindrical portion 17 having an outer surface in intimate electrical contact with the inner surface of metal layer 12. Cylindrical portion 17 is contiguously joined at junction 19 to a partial or truncated conical portion 20 which in turn is contiguous with a partial spherical portion 18. The junction 19 between conical portion 20 and cylindrical portion 17 is rounded to avoid any concentration of lines of force of the electric field.

Preferably, the cap 13, or at least the cylindrical portion thereof, is made flexible and elastic so that it may be removably inserted into metal layer 12 and maintained in intimate electrical contact therewith. Specifically, cylindrical portion 17 and a portion of the length of conical portion 20 may be divided by a plurality of slits which extend along respective generatrices thereof, thereby forming a plurality of flexible longitudinally extending lamellae or members 21 having identical dimensions. The number and distribution of members 21 are not in and of themselves critical to the present invention and will generally be determined as a function of the parameters of the particular ozone generation device and electric field involved.

The center most portion of partial spherical portion 18 has therein any suitable means 22 for connection with connector 14.

The configuration of cap 13 will be designed, in accordance with a given installation, to substantially correspond to that of equipotential surfaces which are established upon the application of a voltage between the inner and outer electrodes of the ozone generator.

By the provision of the structure discussed above, it is possible to provide the ozone generator with an inner electrode configuration which will substantially eliminate the emission of spark discharge between the outer end of the inner electrode and the facing end or area of the outer electrode. In fact, the ozone generation device having the inner configuration in accordance with the present invention substantially eliminates the occurrence of such arc discharges even at voltages which substantially approximate maximum theoretical applied voltages. This is believed to generally be due to the fact that the inner electrode configuration in accordance with the present invention provides a homogeneous field at the end of the inner electrode structure, due to the fact that the end portion of the inner electrode structure is in the form of a closed surface which is void of rough portions or gaps, to thereby prevent any accumulation of electrical charge.

A further advantageous feature of the present invention is the elimination of the heretofore necessary brush contact structure ordinarily employed for connecting the metal layer on the inner surface of the dielectric tube with the high voltage AC source. That is, in accordance with the present invention it is possible to merely connect the outermost and centermost portions of the cap 13 directly to the high voltage AC source, thereby entirely avoiding the need for the previously necessary brush contact structure.

A futher advantageous feature of the present invention is that, since the electric field is much more homogeneous and more effectively and efficiently distributed at the outer end of the inner electrode structure than in prior art arrangements, it is possible to eliminate the undulated portion 4 of the outer end of the dielectric tube and to reduce the length of insulating portion of such tube. Thus, as will be apparent from a comparison of FIGS. 1 and 2 of the drawings, the dielectric tube 9 in accordance with the present invention need not include the undulating portions 4 which are generally necessary for practical application in prior art devices. Furthermore, in accordance with the present invention it is possible to reduce the length of the dielectric tube. For example, in a practical embodiment of the ozone generation device, it was possible to reduce the length of the dielectric tube from 18 cm to 9 cm.

The features and advantages of the present invention will become more apparent from the following example describing a practical embodiment of the present invention, it being understood that such example is intended to be illustrative only and in no way restrictive to the scope of the present invention.

EXAMPLE

An otherwise conventional overall ozone generation system included seven generator devices. All seven of the devices included identical and conventional ground or outer electrode configurations. Five of the devices included conventional inner electrode configurations, while the remaining two devices included inner electrode configurations in accordance with the present invention.

Specifically, in each such inner electrode according to the present invention, the cylindrical dielectric glass tube 9 had an outer diameter of 74.2 mm and a thickness of 1.6 mm. End 10 was closed and end 11 was open. Inner layer 9 comprised an aluminum layer. Cap 13 was of stainless steel and had a partial spherical portion having a diameter of 50.8 mm, a conical portion having a length of 42 mm, with the diameter of the large base of the truncated conical portion being 73.6 mm, and a cylindrical portion having a length of 40 mm. Twenty-two identical slits, each having a width of 3 mm, extended through the entire length of the cylindrical portion and through two-thirds of the length of the conical portion.

All of the devices, including the five conventional devices and the two devices in accordance with the present invention, were subjected to an AC voltage of 50 cycles per second at an effective value of 14 kilovolts, gradually increased to 24 kilovolts. In each of the five conventional devices, beginning at about 16 kilovolts, discharging or sparking occurred. However, in the two electrodes according to the present invention, no such discharging or sparking occurred, even at a total effective voltage of 24 kilovolts, corresponding to a peak voltage of 40.8 kilovolts.

Although the present invention has been described and illustrated with respect to a preferred embodiment thereof, it will be apparent that various modifications may be made to the specifically described and illustrated features without departing from the scope of the present invention.

What is claimed is:

1. An ozone generation device comprising:
   an outer tubular electrode adapted to be connected to a first terminal of a high voltage AC source;
   a dielectric tube positioned within said outer tubular electrode and spaced therefrom to form a discharge gap, said dielectric tube having a closed first end and an open second end;
   an electrically conductive layer covering a major portion of the inner surface of said dielectric tube;

an electrically conductive cap positioned in contact with said layer adjacent said open second end of said dielectric tube, said cap having a partial spherical portion and a conical portion extending from said partial spherical portion, said partial spherical portion having a closed, substantially continuous and uninterrupted concave surface facing the interior of said dielectric tube; and means for connecting said partial spherical portion to a second terminal of the high voltage AC source, such that said cap and said layer form an inner electrode, and when a voltage is applied between said inner and outer electrodes, an oxygen containing gas circulated through said discharge gap is transformed into ozone by silent discharge.

2. A device as claimed in claim 1, wherein said cap further includes a cylindrical portion extending from said conical portion and in close electrical contact with said layer.

3. A device as claimed in claim 2 wherein the exterior of the area of the junction between said cylindrical portion and said conical portion is rounded to reduce the concentration of lines of force in said area.

4. A device as claimed in claim 2, wherein said cylindrical portion comprises a plurality of flexible longitudinally extending members separated by a plurality of slits.

5. A device as claimed in claim 4, wherein said slits extend longitudinally through a portion of said conical portion.

6. A device as claimed in claim 1, wherein the configuration of said cap substantially corresponds to that of equipotential surfaces established upon the application of said voltage between said inner and outer electrodes.

7. An inner electrode for use in a silent discharge ozone generator of the type including an outer tubular electrode adapted to be connected to a first terminal of a high voltage AC source, a dielectric tube positioned within the outer tubular electrode and spaced therefrom to form a discharge gap, and an inner electrode on the inner surface of the dielectric tube and adapted to be connected to a second terminal of the high voltage AC source, such that when a voltage is applied between the inner and outer electrodes an oxygen containing gas circulated through the discharge gap is transformed into ozone, said inner electrode comprising:

an electrically conductive layer adapted to cover a major portion of the inner surface of a dielectric tube; and an electrically conductive gap positioned in contact with said layer at an end thereof adapted to be adjacent an open end of the dielectric tube, said cap having a partial spherical portion and a conical portion extending from said partial spherical portion, said partial spherical portion having a closed, substantially continuous and uninterrupted concave surface facing the interior of said layer.

8. An inner electrode as claimed in claim 7, wherein said cap further includes a cylindrical portion extending from said conical portion and in close electrical contact with said layer.

9. An inner electrode as claimed in claim 8, wherein the exterior area of the junction between said cylindrical portion and said conical portion is rounded to reduce the concentration of lines of force in said area.

10. An inner electrode as claimed in claim 8, wherein said cylindrical portion comprises a plurality of flexible longitudinally extending members separated by a plurality of slits.

11. An inner electrode as claimed in claim 10, wherein said slits extend longitudinally through a portion of said conical portion.

12. An inner electrode as claimed in claim 7, wherein the configuration of said cap substantially corresponds to that of equipotential surfaces established between an outer electrode and said inner electrode upon the use thereof in a silent discharge ozone generator.

* * * * *